United States Patent [19]

Slater

[11] 4,386,232
[45] May 31, 1983

[54] MULTIPLEXED TOUCH SENSITIVE SCREEN SYSTEM

[75] Inventor: Billy R. Slater, Plano Collin, Tex.

[73] Assignee: Foster Wheeler Energy Corporation, Livingston, N.J.

[21] Appl. No.: 274,112

[22] Filed: Jun. 16, 1981

[51] Int. Cl.³ .............................................. G08C 19/34
[52] U.S. Cl. ..................................... 178/18; 340/712; 340/717
[58] Field of Search ....................... 178/18, 19, 20, 21; 340/365 C, 365 VL, 712, 717

[56] References Cited

U.S. PATENT DOCUMENTS 3,302,194  1/1967  Green et al. ......................... 340/347
3,516,067  6/1970  Cameron ................................ 178/18
3,959,585  5/1976  Mattes et al. .......................... 178/18

OTHER PUBLICATIONS

"Design Guide," Analog (Interfacing to Computer Systems), published by Sierracin Corporation.

Primary Examiner—Stafford D. Schreyer
Attorney, Agent, or Firm—Marvin A. Naigur; John E. Wilson; Richard L. Aitken

[57] ABSTRACT

In a system employing a plurality of touch sensitive screens which generate analog signals representing the coordinates of a position touched, a selection means is provided to select the screens rapidly in sequence with the analog output signals from the selected screen being fed to analog-to-digital converters. The sequence of selection proceeds rapidly from screen to screen until it is detected that a screen has been touched whereupon the selection sequencing pauses to permit the analog-to-digital conversion to be carried out and the resulting digital values to be read out to a computer system. Upon readout of the digital values to the computer system, the screen selection sequencing is again permitted to proceed. Means are provided to indicate whether a selected screen that is being touched was touched the last time the same screen was selected.

14 Claims, 6 Drawing Figures

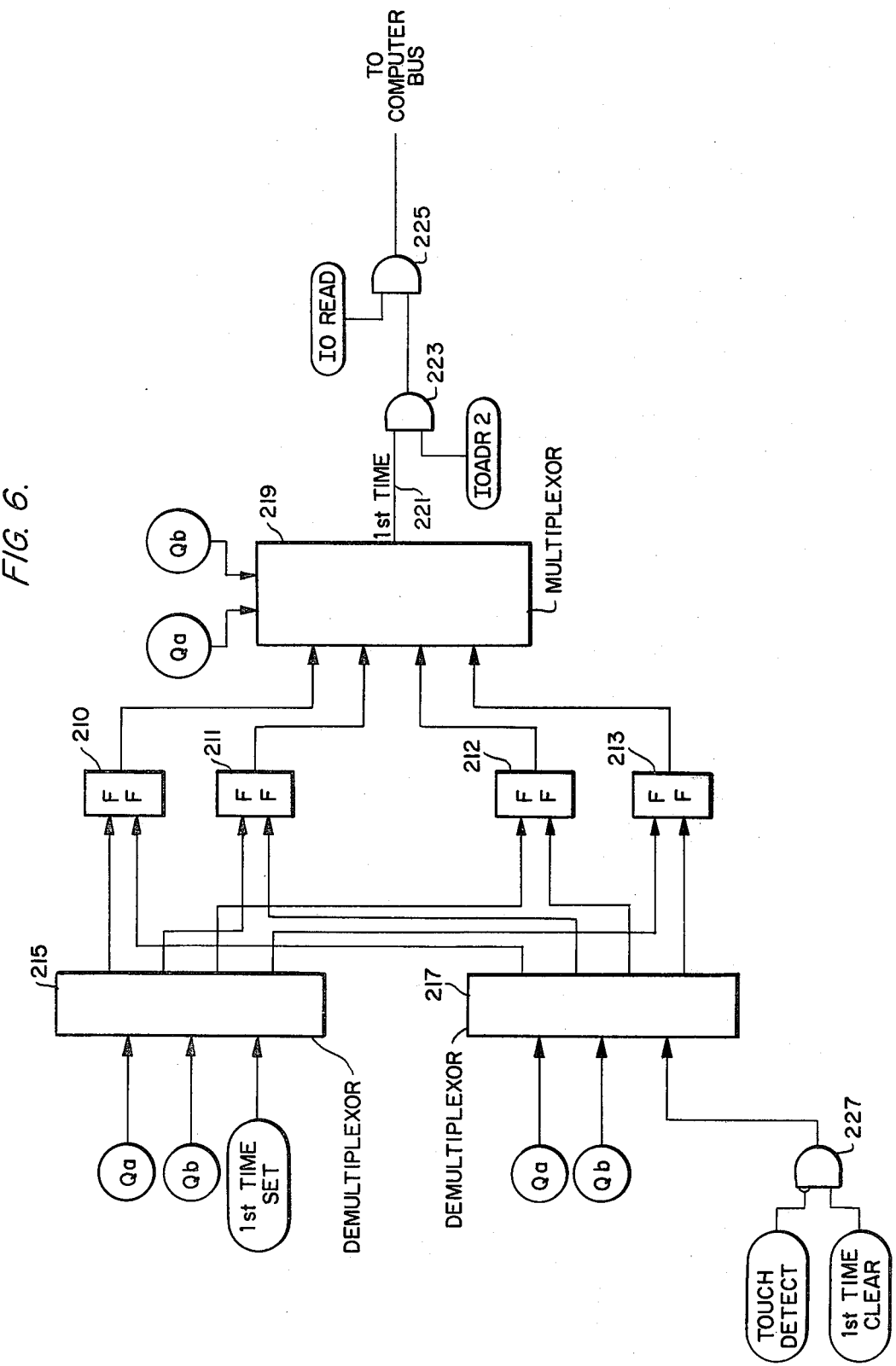

MULTIPLEXED TOUCH SENSITIVE SCREEN SYSTEM

This invention relates to improved touch sensitive screen systems of the type in which the position that a screen is touched is converted to digital signals and more particularly to such a touch sensitive screen system in which a plurality of touch sensitive screens are provided and the signals therefrom multiplexed to a digital computer bus.

In copending application Ser. No. 159,599, invented by Billy R. Slater and filed June 16, 1980, there is disclosed an industrial process control system in which the monitoring and control of the process is effected by a computer system employing cathode ray tubes to display the operating parameters of the industrial process. As disclosed in the application, commands are entered into the computer system to control the operation of the process by touching the screen of the cathode ray tube display. The command that is entered depends upon the location that the cathode ray tube is touched. The position that the screen of the cathode ray tube is touched is detected and converted to digital signals which are received by a computer. The computer then responds to the command represented by the location on the screen which was touched. In the above described system, a transparent touch sensitive panel overlies the cathode ray tube screen. The position that the screen is touched is detected by means of individual electrodes connected along the edges of the touch sensitive panel. The signals from the electrodes are employed to generate a digital representation of the position that the screen is touched.

Another system for detecting the position that the screen is touched has now been developed and is offered for sale by Sierracin Corporation. In this system, the touch sensitive panel is made up of two overlying thin films or sheets of resistive material. Vertical conductive strips are connected along the vertical edges of one of the sheets and horizontal conductive strips are connected along the top and bottom edges of the other resistive sheet. When the screen is touched, the two resistive films make contact at the point that the screen is touched. To detect the position of the touch, a voltage is first applied between the horizontal conducting strips to apply a vertical exciting voltage across the resistive sheet connected therebetween. The voltage level produced at the vertical conducting strips will then represent the vertical coordinate of the position that the screen is touched. The same voltage is then applied between the vertical conducting strips to apply a horizontal exciting voltage across the resistive sheet connected therebetween and the voltage at the horizontal conducting strips will represent the horizontal coordinate of the position that the screen is touched. In order for the computer to use the information represented by the analog signals produced by the screen, the analog signal voltage must be converted to digital data. The exciting voltages applied across the screen can be used in the analog-to-digital conversion as reference voltages to increase the accuracy of the conversion of the analog signals to digital data.

SUMMARY OF THE INVENTION

The system of the present invention makes use of the above described Sierracin touch sensitive screen system with several different screens without making it necessary for the computer system to address each of the different touch sensitive screens separately. In addition, to reduce the computational processing of data carried out by the computer system, the system of the present invention provides an indication to the computer system as to whether or not the digital data representing the position of the touch upon the screen is in response to a new touch on the screen or results from a continuation of the touch applied to the screen the last time the data from the screen was received.

In accordance with the present invention, the touch sensitive screens are selected in sequence in rapid succession with only the vertical excitation voltage being applied to each selected screen until one of the screens is touched. In response to a touch being detected, the selection of the screen being touched is maintained and the vertical coordinate of the position touched is converted to binary data by an analog-to-digital converter responding to the analog output signal from the selected screen. At the completion of the conversion of the signal representing the vertical coordinate, the excitation voltage is switched to be applied to the resistive film connected between the vertical conducting strips and the analog voltage representing the horizontal coordinate of the position being touched is fed to a second analog digital converter, in which this voltage is converted to binary data. At the completion of the conversion of the horizontal coordinate analog signal to binary data, an interrupt signal is applied to the bus of the computer system and, in response to receiving this interrupt signal, the computer system will address the touch sensitive screen system to read out the analog-to-digital converters. Upon reading out the data from the analog-to-digital converters, the selection of the touch sensitive screen in rapid succession will recommence until a touch is again detected on one of the screens whereupon the process of analog-to-digital conversion and read out will be repeated. Each time that binary data is read out representing a position that a selected screen has been touched, a flip-flop corresponding to the selected screen is set. At the time of readout, the state of this flip-flop is also read to provide an indication as to whether or not the data being read out represents a first touch on the selected screen or that the screen was touched the last preceding time that the screen was selected.

Accordingly, an object of the present invention is to provide a system for effectively multiplexing a plurality of touch sensitive screens of the type described.

A further object of the present invention is to provide a signal indication of whether or not the binary data representing the position that a touch sensitive screen is being touched is a new touch on the screen or not.

A further object of the present invention is to provide such a signal in a system in which a plurality of touch sensitive screens are multiplexed.

A still further object of the present invention is to provide a system employing a plurality of touch sensitive screens which system rapidly selects the screens in sequence to determine which screen is being touched and then responds to the screen being touched to generate binary data representing the position that the screen is being touched.

Further objects and advantages of the present invention will become readily apparent as the following detailed description of the invention unfolds.

BRIEF DESCRIPTION OF THE DRAWINGS

FIG. 6 illustrates the first time signal generation circuitry of the system of the present invention.

DESCRIPTION OF THE PREFERRED EMBODIMENT

Figure 1:
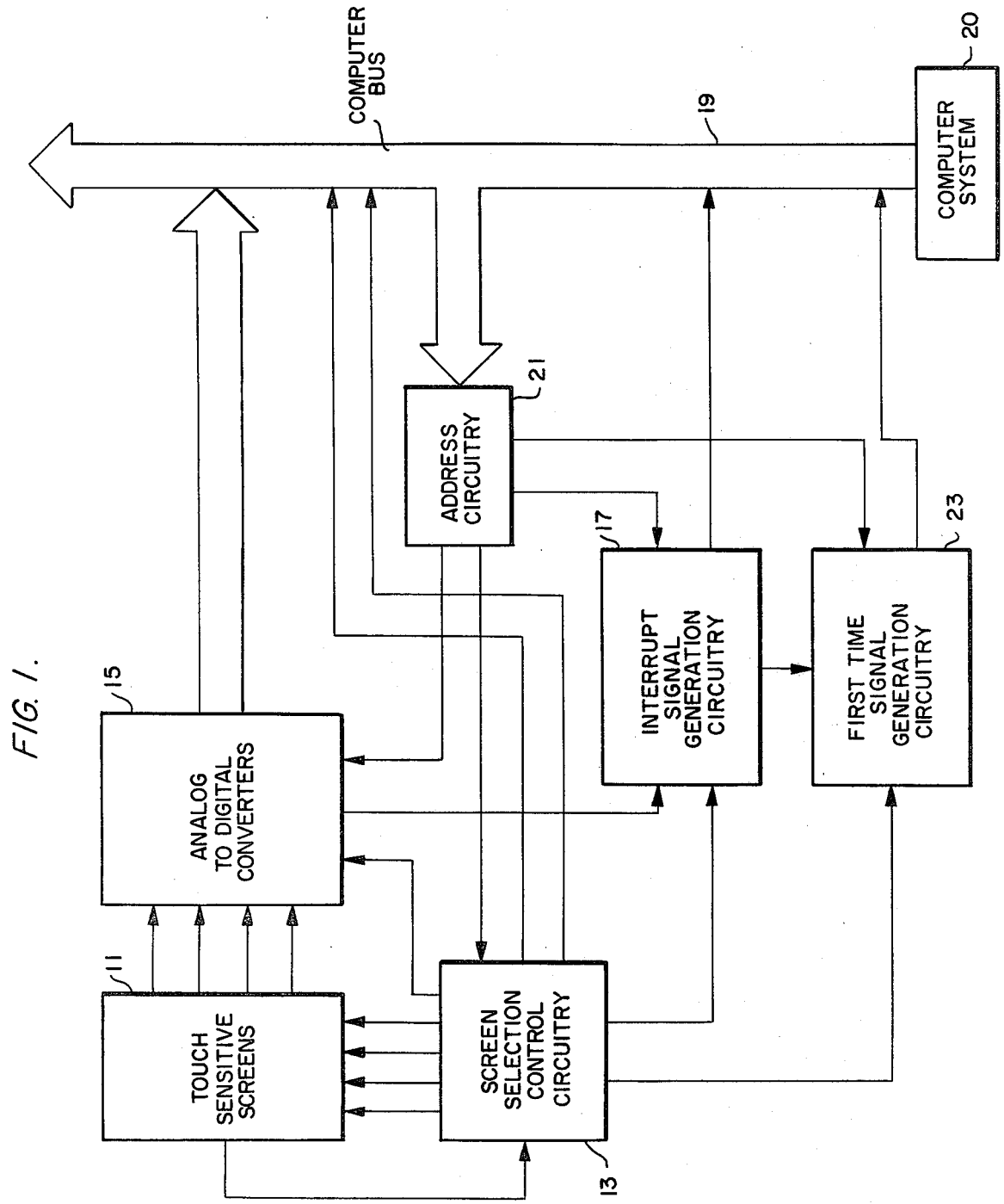
FIG. 1 is a block diagram illustrating the overall system of the present invention.

In accordance with the present invention, a plurality of touch screens are provided. These touch screens, which in the preferred embodiment are four in number, are the type manufactured and sold by Sierracin Corporation and each operates to generate analog signals to represent the position on the screen that the screen is touched, one analog signal representing the horizontal coordinate of the position that the screen is touched and the other representing the vertical coordinate of the position that the screen is touched. As shown in FIG. 1, the touch sensitive screens are designated as a group by the reference number 11. Screen selection control circuitry 13 selects each screen in sequence and gates the analog output signals from the selected screen to analog-to-digital converters 15. If a screen is not touched when selected by the screen selection circuitry 13, the screen selection circuitry immediately proceeds to select the next screen in the sequence without waiting for the analog-to-digital conversion to be carried out. If a selected screen is being touched, the screen selection circuitry maintains the selection of the touched screen while the analog-to-digital conversion of the analog output signals from the screen is completed. When the analog-to-digital conversion is completed, the converters 15 will indicate the completion of the conversion to the interrupt signal generation circuitry 17, which thereupon will provide an interrupt signal to the computer bus 19. A computer system 20, such as that disclosed in application Ser. No. 159,599, in response to receiving the interrupt signal will then address the touch sensitive screen system by applying the appropriate binary address signals to the bus 19. The address signals will be detected by the address circuitry 21, which will then enable the analog-to-digital converters 15 to apply the digital signals representing the horizontal and vertical coordinates of the position which has been touched on the selected touch sensitive screen to the computer bus 19. In this manner, the computer system 20 receives and may utilize the digital data representing the position that the screen was touched.

When the address circuitry causes the digital signals to be read out from the analog-to-digital converters 15 to the computer bus 19, it also signals the screen selection control circuitry 13 to allow it to again continue selecting the touch sensitive screens in rapid sequence and it also resets the interrupt signal generation circuitry.

When a screen is touched, the person touching the screen may maintain the touch for a period which is sufficiently long for the system to complete the analog-to-digital conversion, cycle through the other remaining screens, and again select the touched screen. The first time signal generation circuitry 23 provides a signal to the computer bus 19 indicating whether or not the touch sensitive screen was touched the last time the screen was selected. If the signal from the first time signal generation circuitry 23 indicates that the digital information being received represents the first time that the screen was touched, then the computer system 20 will respond to the touch in the manner described in the above mentioned copending application Ser. No. 159,599. On the other hand, if the screen was touched the last time the screen was selected, the first time signal generation circuitry 23 will indicate this fact to the computer over the bus 19 and the computer then need not repeat functions that it has already performed in response to the original digital information received from the analog-to-digital converters 15.

The first time signal generation circuitry 23 normally generates a signal indicating that the screen was not touched. Then when the address circuitry 13 causes the analog-to-digital converters 15 to be read out, the address circuitry 21 signals the first time signal generation circuitry 23 and causes it to store a bit to indicate that the selected screen was touched. Then, the next time the screen is selected, if the screen is still being touched, the first time signal generation circuitry 23 will apply a signal to the bus 19 indicating that the selected touch sensitive screen was touched the preceeding time that it was selected. The signal from the first time signal generation circuitry is read out to the bus 19 along with the binary signals representing the position that the screen is being touched. The first time signal generation circuitry 23 is reset to indicate that the selected screen was not selected during the last preceeding cycle immediately prior to the selection of the screen if the selected screen is not being touched immediately prior to selection thereof.

Figure 2:
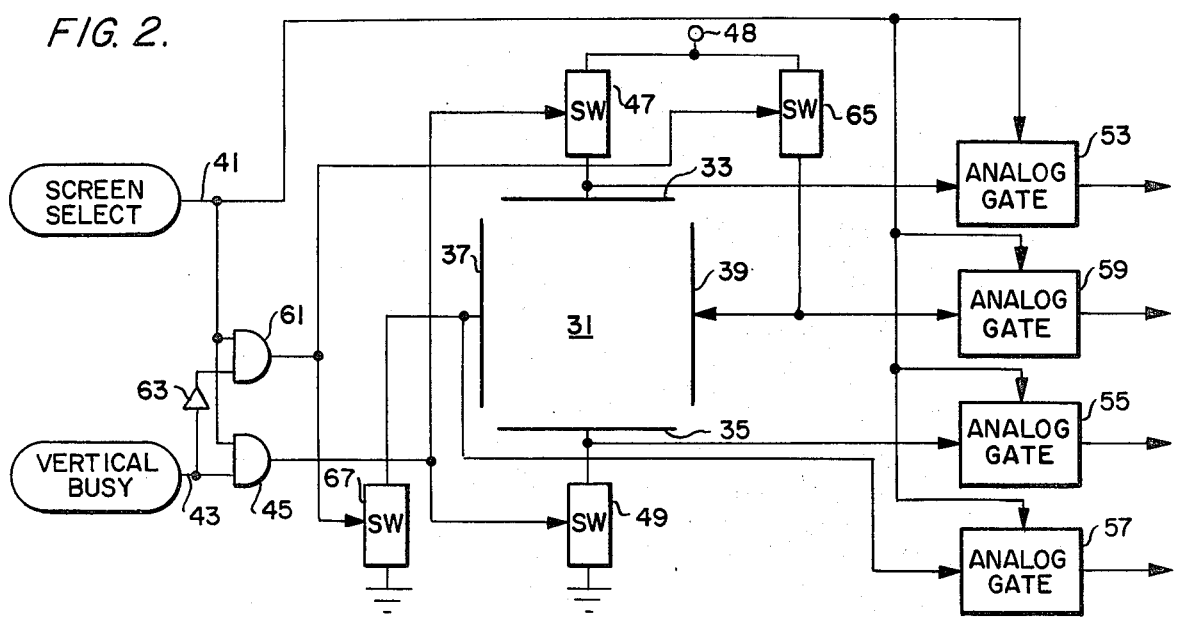
FIG. 2 is a schematic block diagram illustrating the circuitry for exciting one of the touch sensitive screens of the present invention.

As shown in FIG. 2, which schematically illustrates the circuitry for exciting and controlling one of the touch sensitive screens of the system, the touch sensitive screen is designated generally by the reference number 31. As pointed out above, the touch sensitive screen employed in the system of the present invention is manufactured by the Sierracin Corporation and comprises two thin resistive sheets overlying the face of a cathode ray tube display device. Horizontal conductive strips 33 and 35 are connected to one resistive sheet along the upper and lower edges thereof. Vertically conductive strips 37 and 39 are connected to the other resistive sheet along the vertical sides thereof. When the screen is selected, a screen enabling signal will be applied to the circuit as shown in FIG. 2 on channel 41. Initially, another signal, referred to as a vertical busy signal, is applied to the screen control circuitry on channel 43. The signals on channels 41 and 43 are applied to an AND gate 45, the output of which is used to close electronic switches 47 and 49. The electronic switch 47 connectes a positive voltage potential applied at terminal 48 to the conductive strips 33 and an electronic switch 49 connects the conductive strip 35 to ground. As a result, an excitation voltage is applied across the resistive sheet connected between the strips 33 and 35 in a vertical direction. If the touch sensitive screen 31 is being touched, the resistive sheet between the conductive strips 33 and 35 will act like a potentiometer resistance and the voltage between the strip 39 and the strip 35 will represent the vertical coordinate of the position being touched.

The screen select signal on channel 41 is applied to a series of analog gates 53, 55, 57 and 59 which are connected to receive the analog signal voltage levels on each of the conductive strips 33, 35, 37 and 39. The difference between the signal voltages on screens 39 and 35, as is described in more detail below, are applied to a vertical analog-to-digital converter and a digital signal will be generated representing the vertical coordinate of the position that the screen 31 is being touched.

After the analog-to-digital conversion by the vertical converter is completed, the vertical busy signal on channel 43 will end, and, as a result, the gate 45 will be disabled turning off switches 47 and 49 and, at the same time, a gate 61 will receive an enabling signal on both its inputs. The gate 61 will receive the screen select signal on channel 41 on one input and on the other input, it receives the signal from channel 43 through an inverter 63. The output of the gate 61 will close electronic switches 65 and 67 when the vertical busy signal ends. The electronic switch 65 will connect the conducting strip 39 to the positive voltage potential applied at terminal 48 and the electronic switch 67 will connect the conductive strip 37 to ground. As a result, the excitation voltage will be applied across the resistive sheet connected between the conductive strips 37 and 39 and the signal voltage between the conductive strips 35 and 37 will represent the horizontal coordinate of the position at which the screen is touched. The voltage levels on conductive strips 35 and 37, after passing through the analog gates 55 and 57, are subtracted from one another in circuitry to be described below and then are applied to a horizontal analog-to-digital converter which converts the difference signal to binary values. In this manner, the horizontal and vertical coordinates of the position of the screen that is touched is converted to binary values.

Figure 3:
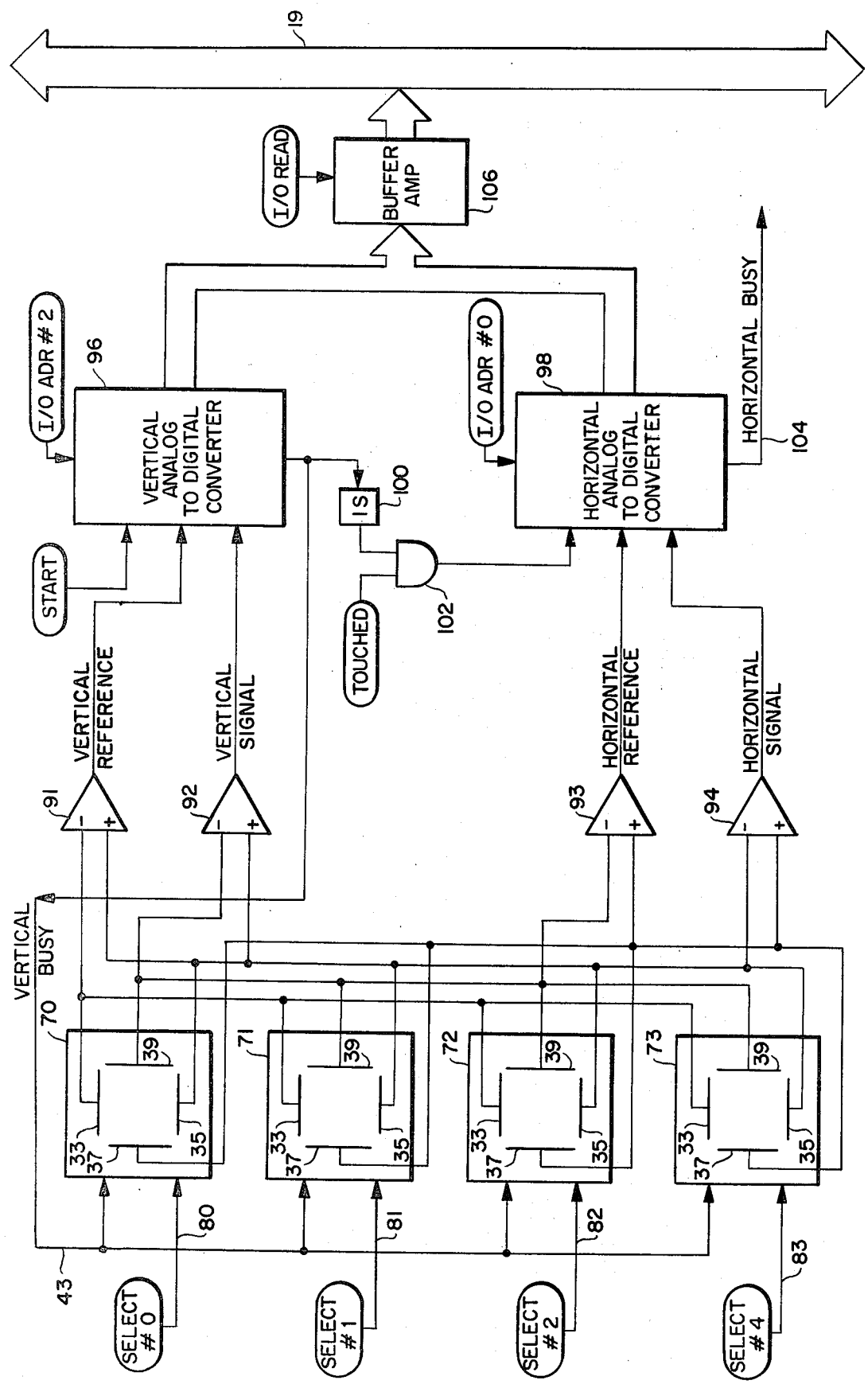
FIG. 3 is a block diagram illustrating how the analog-to-digital converters operate in cooperation with the plurality of touch sensitive screens in accordance with the present invention.

In FIG. 3, the four touch sensitive screens of the system, each with a control circuit as shown in FIG. 2, are schematically represented by the blocks 70-73. In the blocks 70-73, the horizontal conductive strips 33 and 35 and the vertical conductive strips 37 and 39 connected along the edges of the resistive sheets are shown so as to provide an illustration of from which conductive strip the output signal voltages from the screen are derived. The remaining circuitry of FIG. 2 has been omitted for the purpose of simplifying the illustration.

When the touch screen sensitive screen 70 is selected by an enabling signal applied on channel 80 (channel 41 in FIG. 2) and the vertical busy signal is applied to screen 70 on channel 43, the excitation voltage will be applied between the conductive strips 33 and 35 as described above with reference to FIG. 2. Then, when the vertical busy signal ends while the screen select signal is still applied on input channel 80, the excitation voltage will be applied between conductive strips 39 and 37. While the enabling signal is applied on channel 80, the signal voltage generated on each of the conductive strips 33, 35, 37 and 39 of the touch sensitive screen 70 will be gated to a set of differential amplifiers 91-94 as illustrated in FIG. 3.

The touch sensitive screen 71 is selected by an enabling signal applied thereto on channel 81 and it is controlled by the presence or absence of the vertical busy signal on channel 43 in the same manner as the touch sensitive screen 70. While the enabling signal is applied to the touch sensitive screen 71 on input channel 81, the signal voltage generated on the conductive strips 33, 35, 37 and 39 will be gated to the differential amplifiers 91-94. Similarly, the touch sensitive screens 72 and 73 are selected by signals applied on channels 82 and 83, respectively, and are controlled in response to the presence or absence of the vertical busy signal on channel 43 in the same manner as described above with respect to screens 70 and 71. While the enabling signal is applied to screen 72 on channel 82, the signal voltages on the conductive strips of the screen 72 will be gated to the differential amplifiers 91-94 and while the enabling signal is applied to the screen 73 on channel 83, the signal voltages on the conducting strips of the screen 73 are gated to the differential amplifiers 91-94. The enabling signals on channels 80 through 83 are generated in sequence in a repeating cycle by the screen selection circuitry 13.

When one of the screens 70-73 is selected and the signal voltages on the conductive strips thereof are being gated to the differential amplifiers 91-94, the voltage potential from the conducting strip 33 is applied to the minus input side of the differential amplifier 91, the voltage potential from the conductive strip 35 is applied to the plus side of the differential amplifier 91, the plus side of the differential amplifier 92, and to the minus side of the differential amplifier 94, the voltage potential from the conductive strip 37 is applied to the plus side of the differential amplifier 93 and to the plus side of the differential amplifier 94, and the voltage potential from the conductive strip 39 is applied to the minus side of the differential amplifier 92 and the minus side of the differential amplifier 93. Thus, the differential amplifier 91 will produce an output voltage representing the voltage applied between the conductive strips 33 and 35. This voltage will be the excitation voltage applied across the resistive sheet connected between the strips 33 and 35 while the vertical busy signal is being applied to the selected screen. The differential amplifier 92 will produce an output signal voltage representing the voltage difference between the voltage potential at the conductor 39 and the conductor 35. While the vertical busy signal is being produced and the excitation voltage is applied between the conductors 33 and 35, the output signal voltage from the differential amplifier 92 will represent the vertical coordinate of the position that the screen is being touched. This signal voltage is applied to the vertical analog-to-digital converter 96.

The differential amplifier 93 receiving the signal voltages from the conductive strips 39 and 37 from the selected touch sensitive screen will produce an output voltage representing the voltage applied between the conductive strips 37 and 39. When the vertical analog-to-digital converter 96 has completed the analog-to-digital conversion, the vertical busy signal will cease and the excitation voltage will be applied between the conductive strips 39 and 37 of the selected screen. Thus, at that time, the output voltage of the differential amplifier 93 will correspond to the excitation voltate applied between these conductive strips. The differential amplifier 94 receiving signal voltages from the conductive strips 35 and 37 will produce an output signal voltage representing the voltage difference between conductive strips 35 and 37. When the vertical busy signal is not being applied to the touch sensitive screen on channel 43, this signal voltage between the conductive strips 35 and 37 will represent the horizontal coordinate of the position that the selected screen is touched. The output signal voltage of the differential amplifier 94 is applied to the analog-to-digital converter 98.

Each time a new one of the screens 70-73 is selected, a start signal will be applied to the vertical analog-to-digital converter 96, which start signal is generated by the screen selection control circuitry 13 in a manner to be described below. In response to receiving the start signal, the vertical analog-to-digital converter will begin to convert the applied signal voltage from differential amplifier 93 to a digital value using the signal voltage applied from the differential amplifier 91 as a reference. At the same time, in response to receiving the start signal, the vertical analog-to-digital converter 96 will generate the vertical busy signal which will be applied to the touch sensitive screens 70-73 so that the selected touch sensitive screen will have the excitation voltage applied between conductive strips 33 and 35. As a result, the signal voltage from amplifier 92 will represent the vertical coordinate of any position touched on the selected touch sensitive screen and the reference voltage applied to the converter 96 will correspond to the excitation voltage applied between conductive strips 33 and 35. If the selected screen is being touched, the vertical busy signal will continue to be generated until the vertical analog-to-digital converter 96 completes the analog-to-digital conversion whereupon the digital values will remain stored in the analog-to-digital converter 96. Upon completing the conversion, the converter 96 will terminate the vertical busy signal on channel 43. The termination of the vertical busy signal will switch the operation of the selected screen so that the excitation voltage is applied to the resistive sheet between conductive strips 39 and 37. The termination of the vertical busy signal will also trigger a monstable multivibrator (one shot) 100, the output of which is gated by a "TOUCHED" signal received from the screen selection circuitry 13 in an AND gate 102 and is applied to the start input of the horizontal analog-to-digital converter 98. The TOUCHED signal is generated in response to the selected screen being touched as is described in more detail below.

The output pulse from the one shot 100 will pass through the enabled AND gate 102 and the trailing edge of the output pulse, upon being applied to the horizontal analog-to-digital converter 98, will trigger the converter 98 and start it to commence converting the applied output signal from the differential amplifier 94 to digital values using the output voltage of the differential amplifier 93 as a reference. Since the vertical busy signal will no longer be produced at this time, the output signal of the differential amplifier 94 will represent the horizontal coordinate of the position that the selected screen is touched and the output signal of the differential amplifier 93 will correspond to the excitation voltage applied across the resistive sheet of the selected touch sensitive screen horizontally between the conductive strips 39 and 37. While the horizontal analog-to-digital converter carries out the conversion to produce binary values representing the applied horizontal signal from differential amplifier 94, the converter 98 will produce a horizontal busy signal on channel 104. This signal is applied to the interrupt generation circuitry 17 which, in response to the termination of the horizontal busy signal, generates the interrupt signal and applies it to the computer bus 19 and is more fully explained below.

The binary values representing the horizontal signal applied from the differential amplifier 94, like those generated by the converter 96, are stored by the horizontal analog-to-digital converter 98. The computer system 20 in response to receiving the interrupt signal applied to the bus 19 will address the touch sensitive system by sending the appropriate address signals over the bus 19 which address signals will be detected by the address circuitry 21 as described above with reference to FIG. 1. The address signals may either select for read out the binary values stored in the horizontal analog-to-digital converter 98 or the binary values stored in the vertical analog-to-digital converter 96. If the address selects the horizontal analog-to-digital converter 98, the address circuitry 21 will generate an I/O ADR 0 signal which will be applied to the horizontal analog-to-digital converter 98, as shown in FIG. 3, and gate the output signals from this converter to a buffer amplifier 106. The buffer amplifier 106, upon being enabled by the I/O READ signal also generated by the address circuitry 21, will apply the binary signals to the computer bus 19. If the address signals received by the address circuitry 21 select the vertical analog-to-digital converter 96, then the address circuitry 21 will generate an I/O ADR 2 signal which will enable the binary signals stored in the converter 96 to be read out and applied to the buffer amplifier 106 and, upon the generation of the I/O READ signal by the address circuitry 21, the binary signals from the converter 96 are applied to the computer bus 19.

Figure 4:
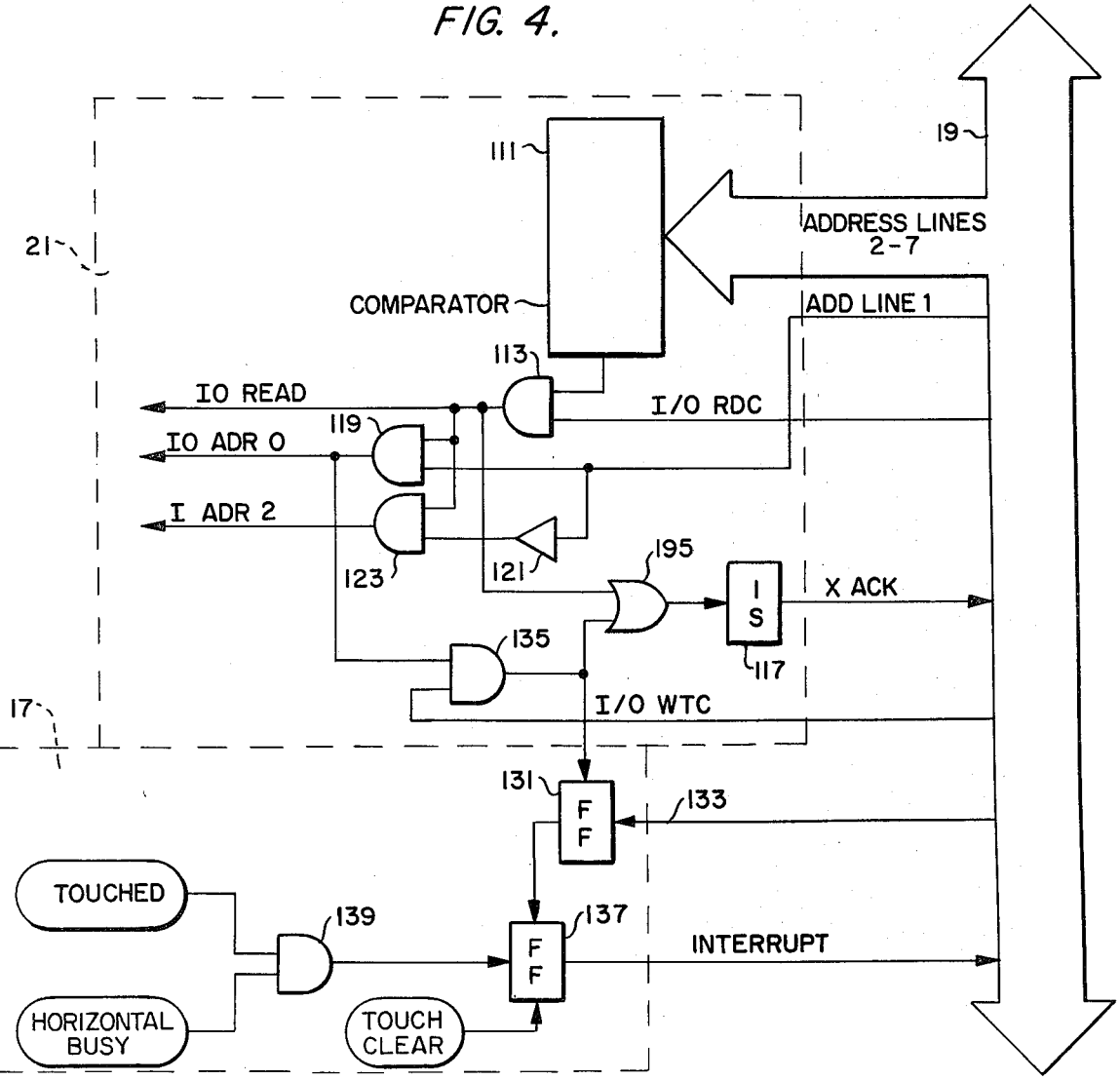
FIG. 4 is a block diagram illustrating the addressing circuitry and the interrupt signal generation circuitry of the system of the present invention.

The address circuitry 21, as shown in FIG. 4, comprises a comparator 111 which compares the address signals on address lines 2-7 of the computer bus 19 with a preset address and if the received address equals the preset address, the comparator 111 produces an enabling signal applied to a gate 113. The gate 113 also receives the I/O RDC timing signal from the bus 19 which is produced on a separate channel of the bus 19 at the same time that the computer system 20 applies the address signals to the bus 19 to provide the timing of the data readout. In response to the I/O RDC signal and being enabled by the output signal from the comparator 111, the gate 113 produces the I/O READ signal, which, as explained above with reference to FIG. 3, enables the buffer amplifier 106. This I/O READ signal is also applied through an OR gate 115 to a one shot 117 which produces a XACK signal, which is applied to a special channel on the bus 19 to signal the computer system 20 that the touch sensitive screen system has received the address signals and the I/O RDC signal. The address signal on address line 1 of the bus 19 is applied to a gate 119 and through an inverter 121 to a gate 123. The gates 119 and 123 are connected to receive the I/O READ signal produced by the gate 113. If the signal on address line 1 is a binary 1, then the gate 119 will be enabled at the time the I/O READ signal is produced and the I/O READ signal will pass through the gate 119 to generate the I/O ADR 0 signal to enable the readout of the binary signals from the horizontal analog-to-digital converter 98, as described with reference to FIG. 3 above. If the signal on address line 1 is a binary 0, then the gate 123 will be enabled and the I/O READ signal will pass through the gate 123 to generate the I/O ADR 2 signal. This signal will then enable the readout of the binary signals from the vertical analog-to-digital converter 96, as described above. Thus, the address signals on bus 19 can select either the vertical analog-to-digital converter 96 or the horizontal analog-to-digital converter 98 for readout of the stored binary signals. Normally, in response to the interrupt signal, the computer system 20 will first send out address signals to select the horizontal analog-to-digital converter 98 and then will address the vertical analog-to-digital converter 96.

FIG. 4 also illustrates the interrupt generation circuitry 17. The interrupt circuitry 17 contains means to prevent the touch sensitive system from generating an interrupt during computer start-up before the computer system 20 is ready for an interrupt signal. For this purpose, a flip-flop 131 is provided in the interrupt generation circuitry 117. The flip-flop 131 is initially set to zero at computer start-up. When the computer system is ready to receive an interrupt from the touch sensitive screen system, it writes a 1 from the bus 19 into the flip-flop 131. For this purpose, a selected data line of the bus 19 is connected to the flip-flop 131 over channel 133. When the computer system 20 writes a 1 into the flip-flop 131, it will apply a binary 1 to this data line in the computer bus 19 and apply the preset address to address lines 2–7 and will apply a one to address line 1. The computer system also will generate the write timing signal I/O WTC, which is applied to a gate 135. The gate 135 will be enabled by the I/O ADR 0 output signal of gate 119 and will pass the I/O WTC signal to the clock input of the flip-flop 131 which thereupon will clock in the data signal applied on channel 133. This operation will cause the 1 to be written into the flip-flop 131. In a similar manner, the system 20 can write a binary 0 into the flip-flop 131 by merely applying a binary 0 to the data channel in the bus 19 connected to channel 133 sending out the appropriate address signals on address lines 1–7 along with the I/O WTC signal. The I/O WTC signal upon passing through the gate 135, will pass through OR gate 125 to trigger the one shot 117, which thereupon will generate a XACK signal to indicate over bus 19 to the computer system that the address and I/O WTC signal have been received.

When the flip-flop 131 stores a binary 1, the touch sensitive screen system is enabled to generate an interrupt signal to the computer bus 19. When the flip-flop 131 stores a binary 1, it will apply a signal to the flip-flop 137 to enable the flip-flop 137 to store a one when the flip-flop 137 receives an appropriate output signal from a gate 139. The gate 139 receives the TOUCHED signal from the screen selection circuitry 13, which, as explained above, is generated in response to the selected one of the screens having a touch applied thereto. The gate 139 also receives the horizontal busy signal generated by the horizontal analog-to-digital converter 98. If the TOUCHED signal is being generated, the horizontal busy signal will be transmitted through the gate 139 to the flip-flop 137. When the horizontal busy signal applied to the flip-flop 137 ends, this will cause the flip-flop 137 to store one if enabled by the flip-flop 131. Thus, if the flip-flop 131 stores a one, the flip-flop 137 will be switched to store a one upon termination of the horizontal busy signal. When the flip-flop 137 stores a one, it generates the interrupt signal and applies it to the interrupt line in the bus 19. In this manner, the interrupt signal generation circuitry generates the interrupt signal upon termination of the horizontal busy signal.

When the address circuitry 21 detects that the touch sensitive screen system is being addressed by the computer system and the address line 1 contains a zero indicating that the digital values stored in the vertical analog-to-digital converter are to be read out, the screen selection control circuitry 13 in a manner described more fully below will generate a touch clear signal which is applied to the interrupt signal generation circuitry 17. In the interrupt signal generation circuitry 17, the touch clear signal will be applied to the flip-flop 137, as shown in FIG. 4, to reset it to its zero state so that the interrupt signal will be discontinued. In this manner, the interrupt signal is ended upon the vertical analog-to-digital converter being read out to the computer bus 19.

Figure 5:
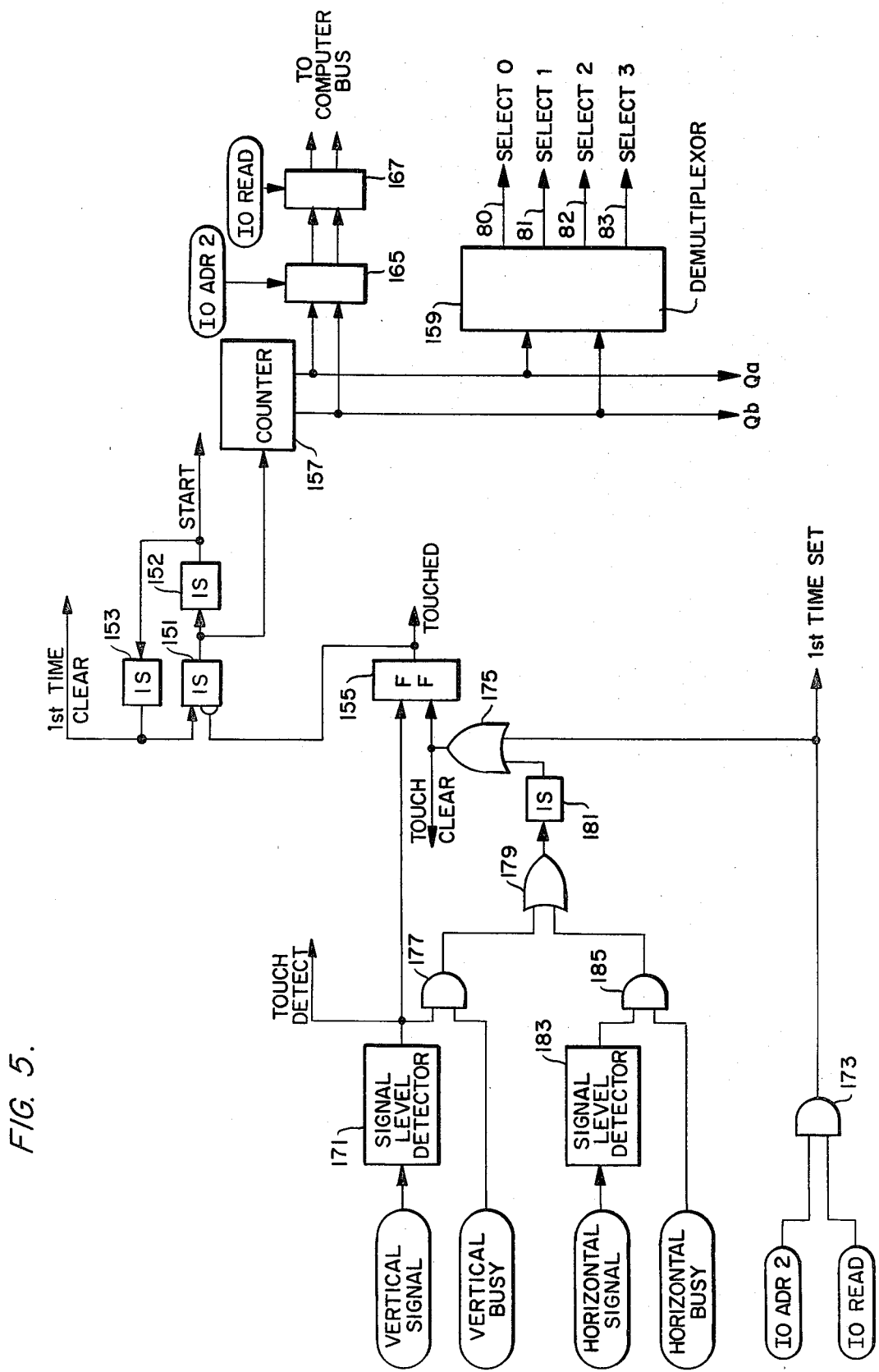
FIG. 5 is a block diagram illustrating the screen selection control circuitry of the system of the present invention.

The screen selection control circuitry 13, as shown in FIG. 5, comprises three monostable multivibrators or one shots 151, 152 and 153 which are arranged in the ring whereby the trailing edge of the pulse produced by the one shot 151 will trigger the one shot 152, the trailing edge of the pulse produced by the one shot 152 will trigger the one shot 153 and the trailing edge of the pulse produced by the one shot 153 will trigger the one shot 151 if the one shot 151 is not disabled by the TOUCHED signal, which is produced by a flip-flop 155. As long as the flip-flop 155 is not in its TOUCHED state, it will not generate the TOUCHED signal and the one shots 151–153 will produce pulses in a continuous repeating sequence. The pulses produced by the one shot 151 are applied to a two-stage binary counter 157, which, accordingly, recycles upon each count of four applied input pulses from the one shot 151. Output signals from the two stages of the counter 157 are named $Q_a$ and $Q_b$ signals and are applied to a demultiplexer 159. The demultiplexer 159, depending upon the count in the counter 157, produces an enabling signal on one of the four output channels 80–83. The select 0 signal is produced on channel 80 when the count in the counter 157 is 0; the select 1 signal is produced on channel 81 when the count in the counter 157 is 1; the select 2 signal is produced on the channel 82 when the count in the counter is 2; and the select 3 signal is produced on the channel 83 when the count in the counter is 3. These signals are applied to select the touch sensitive screens 70–73, as described above with reference to FIG. 3. Thus, as the triggering signal circulates continuously around the three one shots 151–153, the touch sensitive screens 70–73 will be selected in sequence with a new screen being selected each time the one shot 151 is triggered and produces an output pulse.

The $Q_a$ and $Q_b$ signals of the counter 157 are a binary representation of the particular screen selected and are applied to gates 165, which will be enabled by the I/O ADR 2 signal to pass the $Q_a$ and $Q_b$ signals to buffer amplifiers 167. The buffer amplifiers 167 are enabled by the I/O READ signal to apply the $Q_a$ and $Q_b$ signals to the appropriate channels in the computer bus 19. Thus, when the computer bus 19 receives binary signals from the vertical analog-to-digital converter 96, it will also receive the $Q_a$ and $Q_b$ signals indicating from which of the touch sensitive screens the binary signals in the analog-to-digital converter have been derived.

As long as none of the touch sensitive screens are touched, the triggering signal will continue to circulate around the one shots 151–153 and the selection of the touch sensitive screens will rapidly sequence repeatedly through the touch sensitive screens. When one of the screens is touched, then when the touched screen is selected, the vertical signal produced by the differential amplifier 92 will rise to a level representing the vertical coordinate of the position that that screen is being touched, as described above with reference to FIG. 3. The vertical signal from the differential amplifier 92 is applied to a signal level detector 171 in the screen selection control circuitry as shown in FIG. 5. If the vertical signal is above a minimum level indicating that the selected screen has been touched, this condition will be detected by the signal level detector 171 and it will generate the TOUCH DETECT signal, which is applied to the flip-flop 155 to set the flip-flop in its touched state. As a result, the flip-flop 155 will generate the TOUCHED signal, which is employed in the circuits illustrated in FIGS. 3 and 4, as described above. The TOUCHED signal is also applied to the one shot 151 and prevents it from being triggered by the output pulse of the one shot 153. Accordingly, when the flip-flop 155 has been set to its TOUCHED state, the one shot 151 will not be triggered, the count in the counter 157 will not increment, and the screen selection signal produced by the demultiplexer 159 will remain on the one of the output channels 80–83 where it is presently being generated.

Each time the one shot 152 produces an output pulse, it applies a START signal to the vertical analog-to-digital converter 196 and causes it to start to begin the conversion of the analog output signal of the differential amplifier 92 to digital values. When the flip-flop 155 has been switched to its touched state, the one shot 151 will not be triggered, which means that the one shot 152 will not be triggered and, accordingly, no new START signal will be generated by the flip-flop 152. As a result, the analog-to-digital conversion by the converter 96 will continue until the conversion is complete and then the horizontal analog-to-digital conversion by the converter 98 will be carried out as described above with respect to FIG. 3.

When a selected screen is not touched, the analog-to-digital conversion for the untouched selected screen will nevertheless commence in response to the start signal that is generated by the output pulse of the one shot 152. However, the conversion will be immediately terminated by a new start signal being generated the next time that the one shot 152 produces its output pulse thus quickly aborting the analog-to-digital conversion of the output from an untouched screen long before the conversion of the output signal from the differential amplifier 92 can be completed.

As described above, when the horizontal analog-to-digital converter 98 has completed its conversion, the termination of the horizontal busy signal will cause an interrupt signal to be generated. This interrupt signal will then cause the computer system 20 connected to the computer bus 19 to first address the horizontal analog-to-digital converter to read out the binary values stored therein and then address the vertical analog-to-digital converter to read out the binary values stored therein. As explained with reference to FIG. 4, the addressing of the vertical analog-to-digital converter will cause generation of the I/O ADR 2 signal along with the I/O READ signal at the time that the binary values are read out. These two signals are applied to an AND gate 173 as shown in FIG. 5. The AND gate 173 accordingly, when the computer addresses the vertical analog-to-digital converter at the time of the I/O READ signal, will produce an output signal, which is applied through an OR gate 175 to reset the flip-flop 155 to its cleared state. The signal passing through the OR gate is referred to as the TOUCH CLEAR signal and also resets the flip-flop 137 to zero, as described above with reference to FIG. 4. When the flip-flop 155 is reset to its cleared state, the disabling signal will be removed from the one shot 151 whereupon the one shot 151 will be triggered to produce its output pulse and the triggering signal will again circulate through the one shots 151 through 153 and the circulation will continue until the signal level detector 171 again detects that the touch sensitive screen selected by the output signal of the demultiplexer 159 has been touched.

Sometimes, while the conversion of the analog signals representing the position that the screen has been touched is being carried out, but before completion thereof, the touch will be removed from the screen. Under such circumstances, it is desired to generate a TOUCH CLEAR signal to stop the conversion and recommence the sequence of the screen selection signals. For this purpose, the TOUCH DETECT signal from the signal level detector 171 is applied to an AND gate 177, which is enabled by the vertical busy signal produced by the vertical analog-to-digital converter while the conversion of the vertical signal is being carried out. Should the TOUCH DETECT signal produced by the signal level detector 171 cease while the vertical busy signal is being produced, the resulting transition in the output signal of the signal level detector 171 will cause a change in the level of the output of the enabled AND gate 177. This change in level will be transmitted through an OR gate 179 to trigger a one shot 181. The output pulse of the one shot 181 is applied to the OR gate 175 and will become the touch clear signal upon passing through this OR gate to thus reset the flip-flop 155 to its cleared state.

The horizontal signal, produced by the differential amplifier 94 as described above with reference to FIG. 3, is applied to a signal level detector 183. The detector 183 detects whether a horizontal signal is above a minimum indicating that the selected screen is being touched while the horizontal analog-to-digital conversion is being carried out. The output signal of the detector 183 is applied to an AND gate 185 which is enabled by the horizontal busy signal. Should the touch on the selected screen cease while the horizontal analog-to-digital conversion is being carried out, the resulting change in the horizontal signal will cause the signal level detector 183 to terminate its output signal. This change in the output signal of the detector 183 will change the level of the output signal of the AND gate 185 enabled by the horizontal busy signal. The change in level of the output signal of the AND gate 185 will be transmitted through the OR gate 179 to trigger the one shot 181. The output pulse of the one shot 181 upon passing through the OR gate 175 will cause the flip-flop 155 to be switched to its cleared state. Thus, should the selected screen which is being touched cease to be touched while either the vertical analog-to-digital conversion or the horizontal analog-to-digital conversion is being carried out, the flip-flop 155 will be switched to its cleared state causing the one shots 151–153 to again be triggered in sequence to cause the next screen to be selected. Should the touch in the selected screen terminate in the interval after the end of the vertical busy signal, but before the horizontal busy signal starts, the one shot 181 will be triggered to generate the touch clear signal in response to the change in the level of the output of the AND gate 185 that will occur when the horizontal busy signal starts.

The first time signal generation circuitry 23 as shown in FIG. 6 comprises four flip-flops 210–213, one for each of the touch sensitive screens 70–73, respectively, two demultiplexers 215 and 217 and a multiplexer 219. The $Q_a$ and $Q_b$ binary signals representing the selected screen, produced by the counter 157, as described above in connection with FIG. 5, are applied to both of the demultiplexers 215 and 217 and to the multiplexer 219. The demultiplexer 215 also receives the signal produced by the gate 173 (FIG. 5) at the time the vertical analog-to-digital converter is read out to the computer bus 19. This signal from the gate 175 is named the "FIRST TIME SET" signal. The demultiplexer 215 will pass the FIRST TIME SET signal to the one of the flip-flops 210–213 corresponding to the touch sensitive screen 70–73 currently being selected by the output of the demultiplexer 159 (FIG. 5) and will set this flip-flop to store binary one. The multiplexer 219 at the same time will be applying an output signal from the one of the flip-flops 210–213 corresponding to the selected touch sensitive screen to an output channel 221 to provide the "FIRST TIME" signal. The first time signal on output channel 121 is gated to the computer bus through gates 223 and 225 by the I/O ADR 2 signal and the I/O READ signal so that the state of the one of the flip-flops 210–213 corresponding to the selected touch sensitive screen will be gated to an appropriate data channel on the computer bus 19 at the time the vertical analog-to-digital converter is read out. The flip-flops 210–213 will normally store binary zero. When a screen is touched and the coordinate of the position of the touch is being converted to digital signals for the first time, the one of the flip-flops 210–213 corresponding to the selected touch sensitive screen will store binary zero and there will be a signal representing zero on the output channel 221. After the conversion is completed, and the computer system reads out the horizontal and vertical analog-to-digital converters, upon reading out the vertical analog-to-digital converter, the zero signal on channel 221 will be gated to the computer bus 19 indicating that the data being read out is in response to the first time the selected touch sensitive screen was touched; that is, the screen being read out was not touched the preceeding time that the screen being read out was selected. At the same time that the I/O READ signal gates the signal on 221 to the computer bus 19, it will also produce the FIRST TIME SET signal which will set one of the flip-flops 210–213 corresponding to the selected screen to its one state. The readout from channel 221 will occur before the switching of the flip-flop can occur so that a binary zero is read out indicating that the screen was not touched the last time that the currently selected screen was selected. The next time that the same screen is selected, if the screen is still being touched, the system will go through the process of converting the vertical and horizontal coordinates of the touched position of the screen to digital values and reading these digital values out to the computer bus. However, this time, the one of the flip-flops 210–213 corresponding to the selected screen will store binary one so that there will be a binary one on channel 221. Accordingly, a binary one will be read out to the computer bus 19 indicating to the computer that the selected screen was also touched the preceeding time that the selected screen was selected by the demultiplexer 159.

The TOUCH DETECT signal produced by the signal level detector 171 (FIG. 5) is applied to a gate 227 (FIG. 6) which also is connected to receive the output pulses from the one shot 153 (FIG. 5). These output pulses received from the one shot 153 are named "FIRST TIME CLEAR" signals. The gate 227, unless it is disabled by the TOUCH DETECT signal, will pass the first time clear signal to the demultiplexer 217 which will then pass this signal to the one of the flip-flops 210–213 selected by the $Q_a$ and $Q_b$ signals and clear this flip-flop to store binary zero. Each time a new touch sensitive screen is selected, the one shot 153 will produce the first time clear signal immediately following its selection. If the selected touch sensitive screen was touched the last time it was selected so that the corresponding one of the flop-flops 210–213 stores binary one, but is no longer being touched, the signal level detector 171 in FIG. 5 will no longer be producing the TOUCH DETECT signal and, accordingly, the first time clear signal from the one shot 153 will pass through the gate 227 and reset the one of the flip-flops 210–213 corresponding to the selected touch sensitive screen back to zero. On the other hand, if the signal level detector 171 is producing the TOUCH DETECT signal indicating that the selected touch sensitive screen is still being touched, then the first time clear signal from the one shot 153 will not pass through the gate 227 and the one of the flip-flops 210–213 corresponding to the selected touch sensitive screen will remain in its one state. Then, when the selected screen is read out by the I/O READ signal, the resulting binary one on channel 221 will be read out to the computer bus indicating to the computer that the touch sensitive screen currently being read out was touched the last time that this touch sensitive screen was selected.

As described above the touch sensitive screen multiplexing system rapidly selects each touch sensitive screen in sequence for read out to the analog-to-digital converters with the excitation voltage being applied to each selected screen in the vertical direction only when the selected screen is not touched. When it is detected that the selected screen has been touched, the vertical coordinate of the touched position is converted to binary values, then the excitation voltage is switched to the horizontal direction and the horizontal coordinate of the touch position is converted to binary values. At the completion of the conversion of the horizontal coordinate to binary values, the touch sensitive screen system generates an interrupt signal to the computer bus. In response to receiving the interrupt signal, the computer system will first address the touch sensitive screen system to read out the binary values representing the horizontal coordinate of the touched position and then read out the binary values repeating the vertical coordinate of the touched position. Along with the read out of the binary values of the vertical coordinate of the touched position, the computer system will also read out the $Q_a$ and $Q_b$ signals identifying the selected screen which has been touched and also the first time signal indicating whether or not the binary data represents the first time the screen was touched. After the readout of the vertical analog-to-digital converter, the screen selection is allowed to continue its sequence. In this manner, the multiplexing system pauses for analog-to-digital conversion and read out to the computer system only when a screen has been touched.

The first time signal enables the computer system to reduce the amount of processing carried out in response to the binary data representing touched positions. If the first time signal indicates that the screen was touched the last time the screen was selected and the touched position is in the same target area of the screen, then the computer system does not need to repeat the processing of the touched position data.

The system of the present invention, as described above, thus provides an effective system for multiplexing a plurality of touch sensitive screens of the type which produce analog signals in sequence to represent the coordinates of the touched position and eliminates the requirements of the computer system for separately addressing each of the touch sensitive screens. In addition, signaling is provided to indicate to the computer system whether or not the data from each screen represents a new touch on the screen or represents a continuation of the touch the preceeding time the screen was selected thus reducing the amount of processing of the touched position data by the computer system.

The specific embodiment of the invention described above has been presented as employing touch sensitive screens, which are one form of position sensing means. It will be appreciated that the principles of the invention in its broader aspects are applicable to position signaling systems in which the position sensing means takes other forms. For example, position sensing means could be of a type to respond to a position input effected by means of a light pen. Also, the concept of the first time signal generation, while being particularly advantageous when used in combination with a system for multiplexing the outputs from position sensing means, is applicable to systems employing only a single position sensing means. Many other modifications may be made to the above described specific embodiment of the invention without departing from the spirit and scope of the invention in its broader aspects.

What is claimed is:

1. A system for signaling position comprising a plurality of position sensing means each having a screen and operable to generate analog signals representing input positions to said screen, sequencing means to select said position sensing means in sequence and to gate the analog signals from the selected position sensing means to a common output when selected, an analog-to-digital converter operable to convert the analog signal at the common output to a digital representation, detection means to detect when a selected position sensing means has an input applied to the screen thereof, said sequencing means halting its sequence of selecting said position sensing means and maintaining the selection of the currently selected position sensing means in response to the detection by said detection means of an input applied to the screen of the currently selected position sensing means.

2. A system for signaling position as recited in claim 1, wherein there is provided means to restart said sequencing means and cause it to continue the selecting of said position sensing means in sequence following the completion of the conversion of the analog signal at said common output to a digital representation.

3. A system for signaling position as recited in claim 2, wherein there is provided gating means to gate said digital representation to a computer bus and wherein said means to restart said sequencing means operates to restart said sequencing means after the gating of said digital representation to said computer bus by said gating means.

4. A system for signaling position as recited in claim 1, wherein each of said position sensing means is excitable in a first mode of operation to generate a first analog representation of one coordinate of the input position to the screen of such position sensing means and is excitable in a second mode of operation to generate an analog representation of a second coordinate of the position of the input to such screen, each of said position sensing means being initially excited in said first mode when selected, and means to cause the selected position sensing means to be excited in said second mode after said analog-to-digital converting means has converted the analog representation of said first coordinate to digital representation, said sequencing means selecting the next position sensing means in sequence while the currently selected position sensing means is excited in said first mode if an input to the screen of the currently selected position sensing means is not detected by said detecting means.

5. A system for signaling position comprising a plurality of position sensing means each having a screen and being excitable in a first mode to generate a first analog representation of a first coordinate of an input position to such screen and excitable in a second mode to generate a second analog representation of a second coordinate of an input position to such screen, sequencing means to select each of said position sensing means in a repeated sequence causing each position sensing means to be excited in said first mode when initially selected, detecting means to detect whether the selected position sensing means has an input to the screen thereof, and means to cause the selected position sensing means to be excited in said second mode only if said detection means detects an input to the screen of the selected position sensing means.

6. A position signaling system as recited in claim 5, wherein there is provided converting means operable when said detecting means detects an input to the screen of the selected position sensing means to convert the analog representation of the coordinates of the position of the input to the screen of the selected position sensing means to a digital representation.

7. A position signaling system as recited in claim 6, wherein said means to cause the selected position sensing means to be excited in said second mode causes the excitation of the selected screen in said second mode after said converting means has converted the analog representation of the first coordinate of the position of the input to a digital representation, said converting means converting the analog representations of said first and second coordinates of the position of the input in sequence while the position sensing means remains selected.

8. A position signaling system as recited in claim 6, wherein the time required by said converting means to convert said analog representations to digital values is greater than the time that each of said position sensing means is selected by said sequencing means in said sequence when said detecting means fails to detect an input to the screen of such position sensing means, said sequencing means maintaining the selection of the currently selected position sensing means in response to the detection of an input to the screen of the selected position sensing means by said detecting means to enable said converting means to complete the conversion of the analog representations of the coordinates of position of the input to the screen of the selected position sensing means.

9. A position signaling system comprising a plurality of position sensing means each having a screen and being operable to generate signals representing the co-ordinates of the position of an input to said screen, sequencing means to select said position sensing means in a repeating sequence and gate the output signals of the selected position sensing means to a common output, and means operable when an input to the screen of the selected position sensing means is present to indicate whether an input to the screen of the selected position sensing means was present the preceeding time that the position sensing means was selected.

10. A position signaling system as recited in claim 9, wherein there is provided means operable when an input to the screen of the selected position sensing means is present to convert the signals at said common output to a digital representation of the coordinates of the position of the input to the screen of the selected position sensing means.

11. A position signaling system as recited in any one of claims 1-10, wherein said position sensing means comprise touch sensitive screens and an input to the screen of each position sensing means is a touch upon such screen.

12. A position signaling system comprising a screen, readout means to detect periodically during spaced selection intervals whether an input to said screen is present and to generate signals representing the coordinates of the position of the input to said screen, and means operable when an input to said screen is present to indicate whether an input to said screen was present during the preceding selection interval.

13. A position signaling system as recited in claim 12, wherein said readout means includes means to convert the coordinates of the position of the input to said screen to a digital representation.

14. A position signaling system as recited in claim 12 or 13, wherein said position sensing means comprises a touch sensitive screen and an input to the screen of said position sensing means is a touch upon such screen.

* * * * *